United States Patent
Bassis

(10) Patent No.: US 10,486,512 B2
(45) Date of Patent: Nov. 26, 2019

(54) COMPACT SIDE-BY-SIDE MOTOR GEARBOX UNIT

(71) Applicant: NIO USA, Inc., San Jose, CA (US)

(72) Inventor: Dimitri Bassis, Menlo Park, CA (US)

(73) Assignee: NIO USA, Inc., San Jose, CA (US)

( * ) Notice: Subject to any disclaimer, the term of this patent is extended or adjusted under 35 U.S.C. 154(b) by 0 days.

(21) Appl. No.: 15/690,069

(22) Filed: Aug. 29, 2017

(65) Prior Publication Data
US 2019/0061504 A1   Feb. 28, 2019

(51) Int. Cl.
*B60K 1/02*   (2006.01)
*B60L 3/00*   (2019.01)

(52) U.S. Cl.
CPC .............. *B60K 1/02* (2013.01); *B60L 3/0023* (2013.01)

(58) Field of Classification Search
CPC ..................................... B60K 1/00; B60K 1/02
See application file for complete search history.

(56) References Cited

U.S. PATENT DOCUMENTS

| | | | | |
|---|---|---|---|---|
| 638,643 A * | 12/1899 | Newman | ................ | H02K 7/14 180/65.51 |
| 1,251,749 A * | 1/1918 | Cilley | ................ | B60K 17/046 180/65.1 |
| 1,728,889 A * | 9/1929 | Kemble | ................ | B60G 5/02 180/24.07 |
| 5,743,347 A * | 4/1998 | Gingerich | ................ | B60L 8/00 180/2.2 |
| 5,829,542 A * | 11/1998 | Lutz | ................ | B60K 1/02 180/65.6 |
| 5,927,417 A * | 7/1999 | Brunner | ................ | B60K 1/02 180/374 |
| 6,089,341 A * | 7/2000 | Gingerich | ................ | B60L 8/00 180/2.2 |
| 6,276,474 B1 * | 8/2001 | Ruppert | ................ | B60K 1/02 180/65.6 |
| 6,727,620 B2 * | 4/2004 | White | ................ | B60K 7/0007 310/112 |

(Continued)

FOREIGN PATENT DOCUMENTS

| | | |
|---|---|---|
| CN | 103237673 | 8/2013 |
| CN | 103786568 | 5/2014 |

(Continued)

OTHER PUBLICATIONS

U.S. Appl. No. 15/841,080, filed Dec. 13, 2017, Bassis.

(Continued)

*Primary Examiner* — James A Shriver, II
*Assistant Examiner* — Steve Clemmons
(74) *Attorney, Agent, or Firm* — Sheridan Ross P.C.

(57) ABSTRACT

A compact side-by-side motor gearbox unit is provided. The motor gearbox unit includes two independent electric motors and gearboxes with motor drive shafts and gearbox power output shafts mounted in opposite directions, the motors are held in a shared housing. The drive shafts of each electric motor in the motor gearbox unit are offset from one another and not colinear with one another. The power output shafts of the gearboxes are aligned along a common power output axis providing a half-shaft connection to a drive wheel on one side of the motor gearbox unit and a different half-shaft connection to another drive wheel on the other side of the motor gearbox unit.

20 Claims, 10 Drawing Sheets

(56) References Cited

U.S. PATENT DOCUMENTS

| | | | |
|---|---|---|---|
| 7,028,583 B2 | 4/2006 | Bennett | |
| 7,112,155 B2* | 9/2006 | Keuth | B60K 1/02 475/6 |
| 7,276,005 B2* | 10/2007 | Morikawa | B60K 17/046 475/5 |
| 7,350,606 B2* | 4/2008 | Brill | B60K 7/0007 180/65.51 |
| 7,530,420 B2 | 5/2009 | Davis et al. | |
| 7,627,503 B1 | 12/2009 | Champagne et al. | |
| 7,854,674 B2* | 12/2010 | Freudenreich | B60K 7/0007 475/5 |
| 7,935,014 B2* | 5/2011 | Bachmann | B62D 11/04 475/5 |
| 8,091,677 B2* | 1/2012 | Murty | B60W 20/13 180/293 |
| 8,561,732 B2* | 10/2013 | Schoon | B60K 1/02 180/6.48 |
| 8,640,800 B2* | 2/2014 | Armbruster | B60K 7/0007 180/65.6 |
| 8,640,801 B2* | 2/2014 | Hennings | B60K 7/0007 180/65.6 |
| 8,727,923 B2* | 5/2014 | Huelsemann | B60K 7/0007 475/5 |
| 9,168,818 B2 | 10/2015 | Hirai et al. | |
| 9,487,163 B2* | 11/2016 | Matano | B60K 1/04 |
| 9,566,851 B2* | 2/2017 | Kawamura | B60L 3/0007 |
| 9,724,990 B2 | 8/2017 | Hoermandinger et al. | |
| 10,052,996 B2 | 8/2017 | Valeri et al. | |
| 9,821,650 B2 | 11/2017 | Falls et al. | |
| 9,845,123 B2 | 12/2017 | Byrnes et al. | |
| 10,052,969 B2 | 8/2018 | Valeri et al. | |
| 2005/0092533 A1* | 5/2005 | Ishii | B60K 1/02 180/65.1 |
| 2005/0211490 A1* | 9/2005 | Shimizu | B60K 1/00 180/243 |
| 2006/0225930 A1* | 10/2006 | Schulte | B60K 6/36 180/65.1 |
| 2009/0014223 A1* | 1/2009 | Jones | B60K 17/16 180/65.8 |
| 2010/0108417 A1* | 5/2010 | Gilmore | B60K 6/448 180/65.51 |
| 2011/0094807 A1* | 4/2011 | Pruitt | B60K 1/04 180/65.6 |
| 2011/0162899 A1* | 7/2011 | Blade | B60K 1/00 180/65.1 |
| 2011/0192662 A1* | 8/2011 | Hennings | B60K 6/30 180/65.25 |
| 2011/0259657 A1* | 10/2011 | Fuechtner | B60K 6/52 180/65.21 |
| 2012/0052995 A1* | 3/2012 | Scarbo | B60K 7/0007 474/86 |
| 2012/0058853 A1* | 3/2012 | Schoon | B60K 1/02 475/5 |
| 2017/0130625 A1 | 5/2017 | Jung | |
| 2018/0250982 A1* | 9/2018 | Albl | B60B 35/124 |
| 2018/0345777 A1 | 12/2018 | Birnschein et al. | |

FOREIGN PATENT DOCUMENTS

| | | | |
|---|---|---|---|
| CN | 104967250 | 10/2015 | |
| CN | 205632080 U | 10/2016 | |
| WO | WO 2007/118082 | 10/2007 | |
| WO | WO 2009/017533 | 2/2009 | |
| WO | WO-2017211793 A1 * | 12/2017 | B60K 1/02 |

OTHER PUBLICATIONS

U.S. Appl. No. 15/842,362, filed Dec. 14, 2017, Bassis et al.

"Gasoline Turbocharger," BorgWarner Inc., 2016, retrieved from https://www.borgwarner.com/docs/default-source/investors/investor-events-presentations/bw_investorday_kiosks.pdf?sfvrsn=9, retrieved on Apr. 12, 2018, 40 pages.

"I-Pace Concept," Jaguar, brochure, 2016, 23 pages.

Kane, "Rimac Automobili Enters Electric Vehicle Powertrain Market With True Authority; Will Sell All of Its Highly Specialized Components," INSIDEEVs, 2013, retrieved from https://insideevs.com/rimac-automobili-to-enter-electric-vehicle-powertrain-market-with-true-authority/, retrieved on Apr. 12, 2018, 3 pages.

Official Action for U.S. Appl. No. 15/841,080, dated Aug. 2, 2019, 21 pages.

Notice of Allowance for U.S. Appl. No. 15/842,362, dated May 8, 2019, 9 pages.

\* cited by examiner

COMPACT SIDE-BY-SIDE MOTOR GEARBOX UNIT

FIELD

The present disclosure is generally directed to vehicle transmission systems, in particular, toward electric and/or hybrid-electric vehicle gearboxes.

BACKGROUND

Vehicle transmissions are designed to control the application of power output from an engine. Conventional transmissions generally include a gearbox comprising one or more gears that can be selectively engaged with a power input shaft at a number of gear ratios. The crankshaft, or other rotating member or coupling, of an engine may serve as the power input shaft to the transmission. The transmission and gearbox can provide an output speed, torque, power, or other mechanical characteristic that is different from, or the same as, that provided by the power input shaft of the engine. The power output from the transmission is provided, in some form, to the drive wheel, or wheels, of a vehicle.

Most internal combustion engines rely on the transmission to provide optimal torque and vehicle speeds over a range of operating conditions. In contrast, electric vehicles, employing one or more electric motors, have a wide torque band capable of providing maximum torque output at low or high revolutions per minute (rpm). In some cases, an electric vehicle may include a gearbox configured with a planetary gear reduction. This type of gearbox may be designed to match the rpm of the electric motor to that of the drive wheels.

In any event, transmissions can be large, heavy, noisy, and generally require specific mounting interfaces that can dictate the design and/or limit the configuration of a vehicle.

DETAILED DESCRIPTION

Embodiments of the present disclosure will be described in connection with a vehicle, and in some embodiments, an electric vehicle, rechargeable electric vehicle, and/or hybrid-electric vehicle and associated systems.

Figure 1:
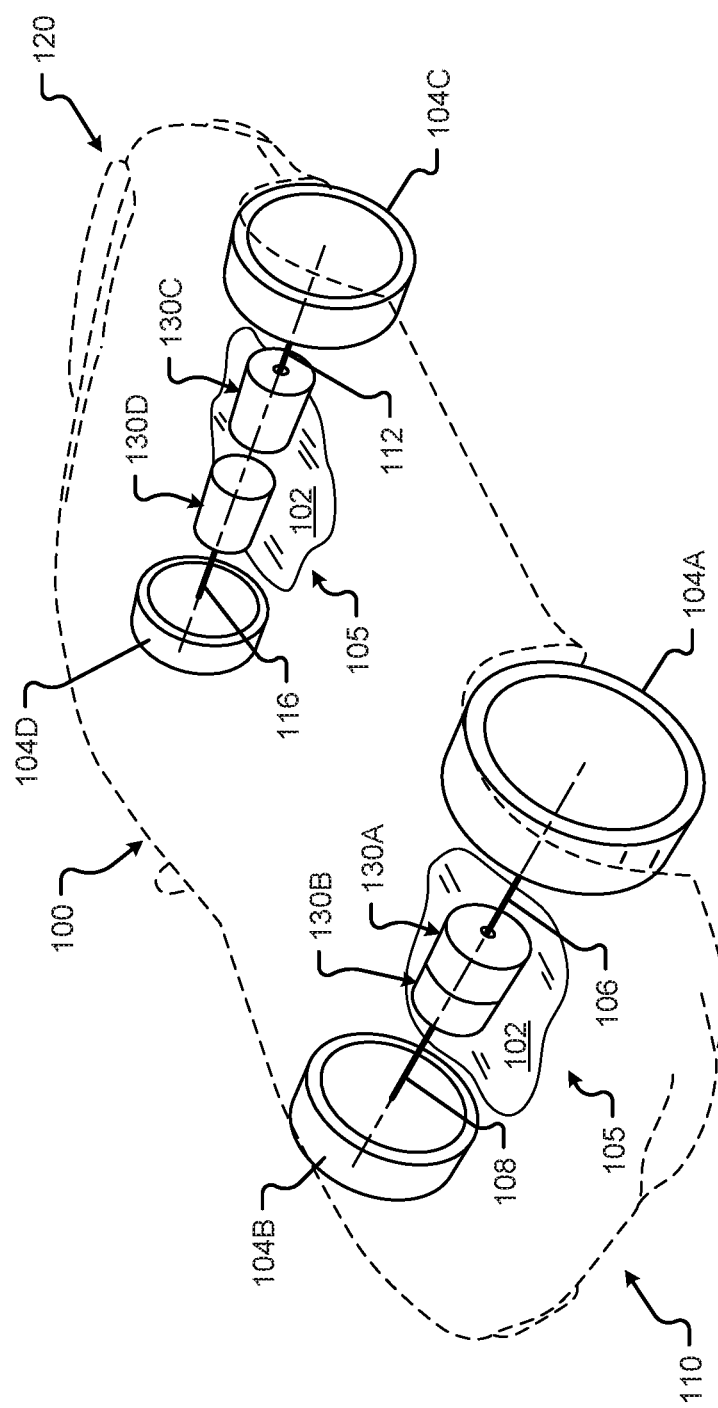
FIG. 1 shows a schematic perspective view of a vehicle powertrain in accordance with embodiments of the present disclosure.

FIG. 1 shows a perspective view of a vehicle powertrain 105 in accordance with embodiments of the present disclosure. The vehicle powertrain 105 may be part of an electric vehicle 100. The vehicle 100 may comprise a vehicle frame 102, vehicle front 110, vehicle aft 120, vehicle roof, at least one vehicle side, a vehicle undercarriage, and a vehicle interior. In some embodiments, the frame 102 may include one or more body panels mounted or affixed thereto. The vehicle 100 may include one or more interior components (e.g., components inside an interior space, or user space, of a vehicle 100, etc.), exterior components (e.g., components outside of the interior space, or user space, of a vehicle 100, etc.), drive systems, controls systems, structural components, etc.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

The powertrain 105 may include one or more motor gearbox units 130A-D. The motor gearbox unit 130A-D may be configured to provide power to one or more wheels 104A-D of the vehicle 100 via at least one drive axle 106, 108, 112, 116. The motor gearbox units 130A-D may include an electric motor that is mechanically coupled with a gearbox. In some embodiments, the motor gearbox units 130A-D may include an inverter. The inverter may be configured to convert direct current (DC) electricity provided from a battery, or other DC power source, into alternating current (AC) electricity that may drive the electric motor of the motor gearbox unit 130A-D.

As shown in FIG. 1, the vehicle 100 may include at least one powertrain 105 located in various positions in the vehicle 100. For instance, the vehicle 100 may include a front drive system, a rear drive system, and/or both a front and rear drive system. In some embodiments, each drive wheel 104A-D may be powered by a separate motor gearbox unit 130A-D. In one embodiment, a single motor gearbox unit 130A-D may provide power to more than drive wheel 104A-D.

In the event that multiple motor gearbox units 130A-D are employed to provide power to the drive wheels 104A-D along the same drive axis, the motor gearbox units 130A-D may share a common, or unified, housing and interconnection to the vehicle frame 102. This unified housing configuration is schematically illustrated in the first and second motor gearbox units 130A, 130B driving first and second drive wheels 104A, 104B, via drive axles 106, 108, respectively. In some embodiments, separate and/or spaced apart multiple motor gearbox units 130C, 130D, having individual or separate housings, may be employed to provide power to the drive wheels 104C, 104D along the same drive axis. In this example, the third and fourth motor gearbox units 130A, 130B may drive third and fourth drive wheels 104C, 104D, via drive axles 112, 116, respectively.

In some embodiments, the motor gearbox unit 130A-D may be mounted to a portion of the vehicle 100 via one or more attachment points. For instance, the motor gearbox unit 130A-D may be interconnected with the vehicle chassis or frame 102 via a bolted connection, clamped connection, or other attachment. In one embodiment, the housing of the motor gearbox unit 130A-D may include one or more features configured to provide a removable connection to the frame 102 of the vehicle 100. These features can include, but are in no way limited to, one or more flanges, ledges, feet, pads, protrusions, bolt holes, apertures, studs, threaded holes, threaded rods, etc., and/or combinations thereof. In any event, the fixed interconnection of the motor gearbox unit 130A-D with the vehicle frame 102 can allow power to be efficiently transmitted from the motor through the gearbox and drive axles 108, 110, 112, 116 to one or more drive wheels 104A-D.

The frame 102 may comprise a separate frame and body construction (i.e., body-on-frame construction), a unitary frame and body construction (i.e., a unibody construction), or any other construction defining the structure of the vehicle 100. The frame 102 may be made from one or more materials including, but in no way limited to steel, titanium, aluminum, carbon fiber, plastic, polymers, etc., and/or combinations thereof. In some embodiments, the frame 102 may be formed, welded, fused, fastened, pressed, etc., combinations thereof, or otherwise shaped to define a physical structure and strength of the vehicle 100. In any event, the frame 102 may comprise one or more surfaces, connections, protrusions, cavities, mounting points, pads, tabs, slots, or other features that are configured to receive other components that make up the vehicle 100. For example, the body panels, powertrain, controls system, interior components, and/or safety elements may interconnect with, or attach to, the frame 102 of the vehicle 100.

In some embodiments, the frame 102 may include one or more modular system and/or subsystem connection mechanisms. These mechanisms may include features that are configured to provide a selectively interchangeable interface for one or more of the systems and/or subsystems described herein. The mechanisms may provide for a quick exchange, or swapping, of components while providing enhanced security and adaptability over conventional manufacturing or attachment. For instance, the ability to selectively interchange systems and/or subsystems in the vehicle 100 allow the vehicle 100 to adapt to the ever-changing technological demands of society and advances in safety. Among other things, the mechanisms may provide for the quick exchange of batteries, capacitors, power sources, motors, motor gearbox units 130A-D, safety equipment, controllers, user interfaces, interior and/or exterior components, body panels, bumpers, sensors, etc., and/or combinations thereof. Additionally or alternatively, the mechanisms may provide unique security hardware and/or software embedded therein that, among other things, can prevent fraudulent or low quality construction replacements from being used in the vehicle 100. Similarly, the mechanisms, subsystems, and/or receiving features in the vehicle 100 may employ poka-yoke, or mistake-proofing, features that ensure a particular mechanism is always interconnected with the vehicle 100 in a correct position, function, etc.

By way of example, complete systems or subsystems may be removed and/or replaced from a vehicle 100 utilizing a single-minute exchange ("SME") principle. In some embodiments, the frame 102 may include slides, receptacles, cavities, protrusions, and/or a number of other features that allow for quick exchange of system components. In one embodiment, the frame 102 may include tray or ledge features, mechanical interconnection features, locking mechanisms, retaining mechanisms, etc., and/or combinations thereof.

Figure 2:
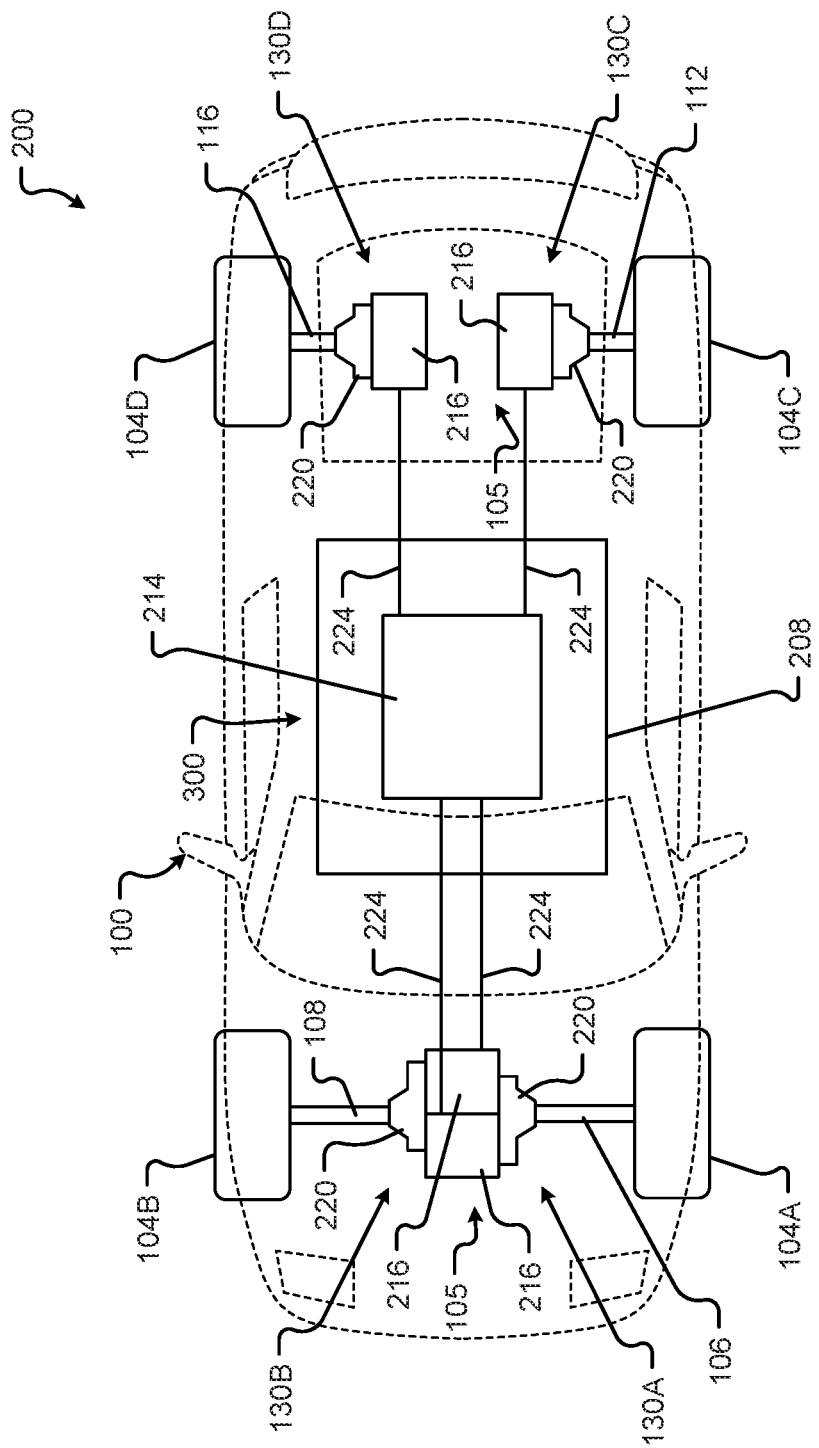
FIG. 2 shows a plan view of the vehicle powertrain in accordance with at least some embodiments of the present disclosure.

Referring now to FIG. 2, a plan view of the vehicle power system 200 will be described in accordance with embodiments of the present disclosure. The power system of the vehicle 100 may include the powertrain 105, power distribution system, accessory power system, and/or any other components that store power, provide power, convert power, and/or distribute power to one or more portions of the vehicle 100. The powertrain 105 may include the one or more electric motors 216 of the vehicle 100. The electric motors 216 are configured to convert electrical energy provided by a power source 208 into mechanical energy. This mechanical energy may be in the form of a rotational or other output force that is configured to propel or otherwise provide a motive force for the vehicle 100 via at least one drive axle 106, 108, 112, 116 interconnected to at least one drive wheel 104A-D.

In some embodiments, the vehicle 100 may include one or more drive wheels 104A-D that are driven by the one or more electric motors 216 via a gearbox 220 and drive axle 106, 108, 112, 116. In some embodiments, the electric motors 216 may include one or more of a motor controller, inverter, and/or an electrical interconnection to the power source 208. As provided above, the vehicle 100 may include an electric motor 216 configured to provide a driving force for each drive wheel 104A-D. In other cases, a single electric motor 216 may be configured to share an output force between two or more drive wheels 104A-D via one or more power transmission components, drive shafts, differentials, etc. It is an aspect of the present disclosure that the powertrain 105 may include one or more power transmission components, motor controllers, and/or power controllers 214 that can provide a controlled output of power to one or more of the drive wheels 104A-D of the vehicle 100. The power transmission components, power controllers 214, or motor controllers may be controlled by at least one other vehicle controller or computer system as described herein. In one embodiment, the power controller 214 may be part of the battery system or power source 208. In some embodiments, the power controller 214 may be separate from, but electrically interconnected with, the power source 208.

As provided above, the powertrain 105 of the vehicle 100 may include one or more power source 208. The power source 208 may be configured to provide drive power, system and/or subsystem power, accessory power, etc. While described herein as a single power source 208 for sake of clarity, embodiments of the present disclosure are not so limited. For example, it should be appreciated that independent, different, or separate power sources 208 may provide power to various systems of the vehicle 100. For instance, a drive power source may be configured to provide the power for the one or more electric motors 216 of the vehicle 100, while a system power source may be configured to provide the power for one or more other systems and/or subsystems of the vehicle 100. Other power sources may include an accessory power source, a backup power source, a critical system power source, and/or other separate power sources. Separating the power sources 208 in this manner may provide a number of benefits over conventional vehicle systems. For example, separating the power sources 208 can allow one of the power sources 208 to be removed and/or replaced independently without requiring that power be removed from all systems and/or subsystems of the vehicle 100 during a power source 208 removal/replacement. For instance, one or more of the accessories, communications, safety equipment, and/or backup power systems, etc., may be maintained even when a particular power source 208 is depleted, removed, or becomes otherwise inoperable.

In some embodiments, the drive power source may be separated into two or more batteries, modules, cells, units, sources, and/or systems. By way of example, a vehicle 100 may include a first drive power source and a second drive power source. The first drive power source may be operated independently from or in conjunction with the second drive power source, and vice versa. Continuing this example, the first drive power source may be removed from a vehicle 100 while a second drive power source can be maintained in the vehicle 100 to provide drive power. This approach allows the vehicle 100 to significantly reduce weight (e.g., of the first drive power source, etc.) and improve power consumption, even if only for a temporary period of time.

The powertrain 105 includes one or more power distribution systems configured to transmit power from the power source 208 to one or more electric motors 216 in the vehicle 100. The power distribution system may include electrical interconnections 224 in the form of cables, wires, traces, wireless power transmission systems, etc., and/or combinations thereof. It is an aspect of the present disclosure that the vehicle 100 include one or more redundant electrical interconnections to the power distribution system. The redundant electrical interconnections 232 can allow power to be distributed to one or more systems and/or subsystems of the vehicle 100 even in the event of a failure of an electrical interconnection portion of the vehicle 100 (e.g., due to an accident, mishap, tampering, or other harm to a particular electrical interconnection, etc.). In some embodiments, a user of a vehicle 100 may be alerted via a user interface associated with the vehicle 100 that a redundant electrical interconnection is being used and/or damage has occurred to a particular area of the vehicle electrical system. In any event, the one or more redundant electrical interconnections may be configured along completely different routes than the electrical interconnections 224 shown and/or include different modes of failure than the electrical interconnections 224 to, among other things, prevent a total interruption power distribution in the event of a failure.

Figure 3:
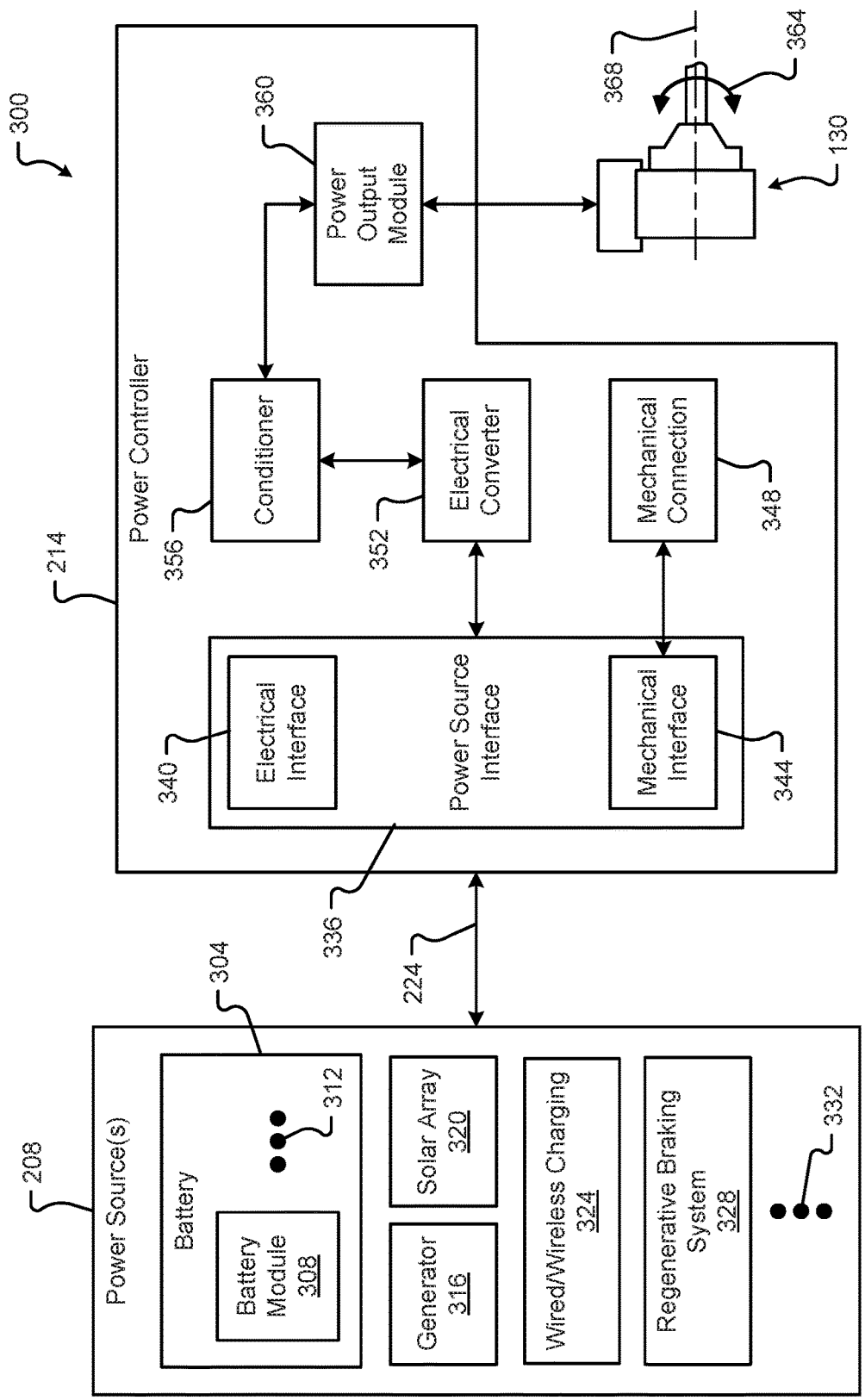
FIG. 3 is a block diagram of a power control system of the vehicle in accordance with embodiments of the present disclosure.

FIG. 3 shows is a block diagram of a power control system 300 of the vehicle 100 in accordance with embodiments of the present disclosure. In particular, the power control system 300 may include a vehicle power source 208 electrically interconnected with the power controller 214. The vehicle may include at least one power source 208 that generates and/or stores power, and/or load(s) (e.g., inverters, motors 216, motor gearbox units 130A-D, devices, systems, subsystems, etc.) that consume power. The power output from the power source 208 may be managed by a power controller 214. Further, the power control system 300 can include one or more other interfaces or controllers other than those shown in FIG. 3.

The power controller 214 can be a computer or computing system(s) and/or electrical system with associated components, as described herein, capable of managing the power output module 360 to receive power, routing the power to and/or from the power source 208, and then providing the power from the power source 208 to at least one load (e.g., motor 216, inverter, motor gearbox unit 130, etc.). Thus, the power controller 214 may execute programming that controls switches, devices, components, etc. involved in the reception, storage, and provision of the power in the power control system 300.

The power sources 208 can include power sources internal and/or associated with the vehicle 100 and/or power sources external to the vehicle 100 to which the vehicle 100 electrically connects. In one embodiment, the power source 208 may include a battery 304. The battery 304 may include one or more battery modules 308, battery management systems, and/or other components 312. The battery 304 may be any type of battery for storing electrical energy, for example, a lithium ion battery, a lead acid battery, a nickel cadmium battery, etc. Further, the battery 304 may include different types of power storage systems, such as, ionic fluids or other types of fuel cell systems. The battery 304 may also include one or more high-capacity capacitors. The capacitors may be used for long-term or short-term storage of electrical energy. The input into the battery 304 or capacitor may be different from the output, and thus, the capacitor may be charged quickly but drain slowly. The functioning of the converter 352 and battery 304 capacitor may be monitored or managed by a charge management unit.

One of the internal power sources can include an on board generator 316. The generator 316 may be an AC generator, a direct current DC generator, or a self-excited generator. The AC generators can include induction generators, linear electric generators, and/or other types of generators. The DC generators can include homopolar generators and/or other types of generators. The generator 316 can be brushless or include brush contacts and generate the electric field with permanent magnets or through induction. The generator 316 may be mechanically coupled to a source of kinetic energy, such as an axle 106, 108, 112, 116 or some other power take-off. The generator 316 may also have another mechanical coupling to an exterior source of kinetic energy, for example, a wind turbine.

In some embodiments, a source of power internal to or associated with the vehicle 100, may be a solar array 320. The solar array 320 may include any system or device of one or more solar cells, or photovoltaics, mounted on the exterior of the vehicle 100 or integrated within the body panels of the vehicle 100 that provides or converts solar energy into electrical energy to provide power to the battery 304 and/or one or more battery modules 308.

Another power source 208 may include wired or wireless charging 324. The wireless charging system 324 may include inductive and/or resonant frequency inductive charging systems that can include coils, frequency generators, controllers, etc. Wired charging may be any kind of grid-connected charging that has a physical connection, although, the wireless charging may be grid connected through a wireless interface. The wired charging system 324 can include connectors, wired interconnections, the controllers, etc. The wired and wireless charging systems 324 can provide power to the battery 304 and/or one or more battery modules 308 from external power sources.

Internal sources for power may include a regenerative braking system 328. The regenerative braking system 328 can convert the kinetic energy of the moving vehicle into electrical energy through a generation system mounted within the wheels, axle, and/or braking system of the vehicle 100. The regenerative braking system 328 can include any coils, magnets, electrical interconnections, converters, controllers, etc. required to convert the kinetic energy into electrical energy.

The power source 208 may be connected to the power controller 214 through an electrical interconnection 224. The electrical interconnection 224 can include any wire, interface, bus, etc. between the one or more power sources 208 and the power controller 214.

The power controller 214 can also include a power source interface 336. The power source interface 336 can be any type of physical and/or electrical interface used to receive the electrical energy from the one or more power sources 208; thus, the power source interface 336 can include an electrical interface 340 that receives the electrical energy and a mechanical interface 344 which may include wires, connectors, or other types of devices or physical connections. The mechanical interface 344 can also include a physical/electrical connection 224 to the power controller 214.

The electrical energy from the power source 208 can be processed through the power source interface 336 to an electric converter 352. The electric converter 352 may convert the characteristics of the power from one of the power sources 208 into a useable form that may be used either by the battery 304 or one or more loads associated with the vehicle 100. The electrical converter 352 may include any electronics or electrical devices and/or component that can change electrical characteristics, e.g., AC frequency, amplitude, phase, etc. associated with the electrical energy provided by the power source 208. The converted electrical energy may then be provided to an optional conditioner 356. The conditioner 356 may include any electronics or electrical devices and/or component that may further condition the converted electrical energy by removing harmonics, noise, etc. from the electrical energy to provide a more stable and effective form of power to the vehicle 100.

In some embodiments, the power controller 214 may include one or more processors, controllers, and/or power output modules 360 configured to control and manage power output from the power source 208 to one or more motors or other loads of the vehicle 100. The power output module 360 may include one or more processor, a memory, switch, and/or electrical interconnection. In one embodiment, the power output module 360 may be configured to receive electrical energy provided by the power source 208 and control an output of the energy to the motors 216 and/or inverters described herein. In some cases, the power output module 360 may include one or more motor controllers.

As shown in FIG. 3, the loads of the vehicle 100 may include at least one motor gearbox unit 130. The motor gearbox unit 130 may include an inverter, an electric motor 216, and a gearbox 220. The gearbox 220 may include at least one power output shaft configured to provide rotational movement 364 in a direction about an output shaft axis 368. In some embodiments, the electric motor 216 can be any type of DC or AC electric motor. In some embodiments, for example, where the motor 216 is a DC motor, the motor gearbox unit 130 may not require an inverter. The motor 216 may be a direct drive or induction motor using permanent magnets and/or winding either on the stator or rotor. The motor 216 may also be wireless or include brush contacts. In any event, the motor 216 may be capable of providing a torque and enough kinetic energy to move the vehicle 100.

Figure 4:
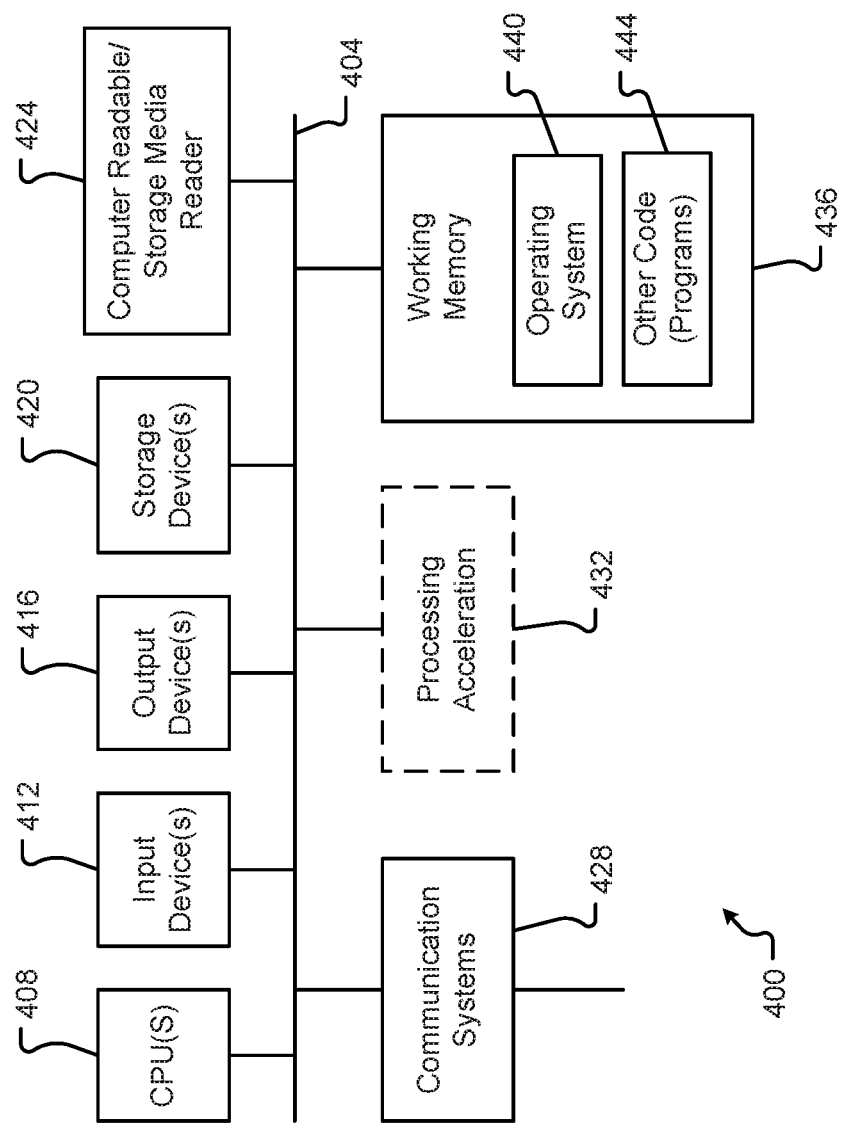
FIG. 4 is a block diagram of a computing device associated with one or more components of the vehicle in accordance with embodiments of the present disclosure.

FIG. 4 illustrates one embodiment of a computer system 400 upon which the processors, computers, computing devices, or other systems or components (e.g., power output module 360, etc.) described above may be deployed or executed. The computer system 400 is shown comprising hardware elements that may be electrically coupled via a bus 404. The hardware elements may include one or more central processing units (CPUs) 408; one or more input devices 412 (e.g., a mouse, a keyboard, etc.); and one or more output devices 416 (e.g., a display device, a printer, etc.). The computer system 400 may also include one or more storage devices 420. By way of example, storage device(s) 420 may be disk drives, optical storage devices, solid-state storage devices such as a random access memory ("RAM") and/or a read-only memory ("ROM"), which can be programmable, flash-updateable and/or the like.

The computer system 400 may additionally include a computer-readable storage media reader 424; a communications system 428 (e.g., a modem, a network card (wireless or wired), an infra-red communication device, etc.); and working memory 436, which may include RAM and ROM devices as described above. The computer system 400 may also include a processing acceleration unit 432, which can include a DSP, a special-purpose processor, and/or the like.

The computer-readable storage media reader 424 can further be connected to a computer-readable storage medium, together (and, optionally, in combination with storage device(s) 420) comprehensively representing remote, local, fixed, and/or removable storage devices plus storage media for temporarily and/or more permanently containing computer-readable information. The communications system 428 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 400 may also comprise software elements, shown as being currently located within a working memory 436, including an operating system 440 and/or other code 444. It should be appreciated that alternate embodiments of a computer system 400 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 408 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments®

Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 5:
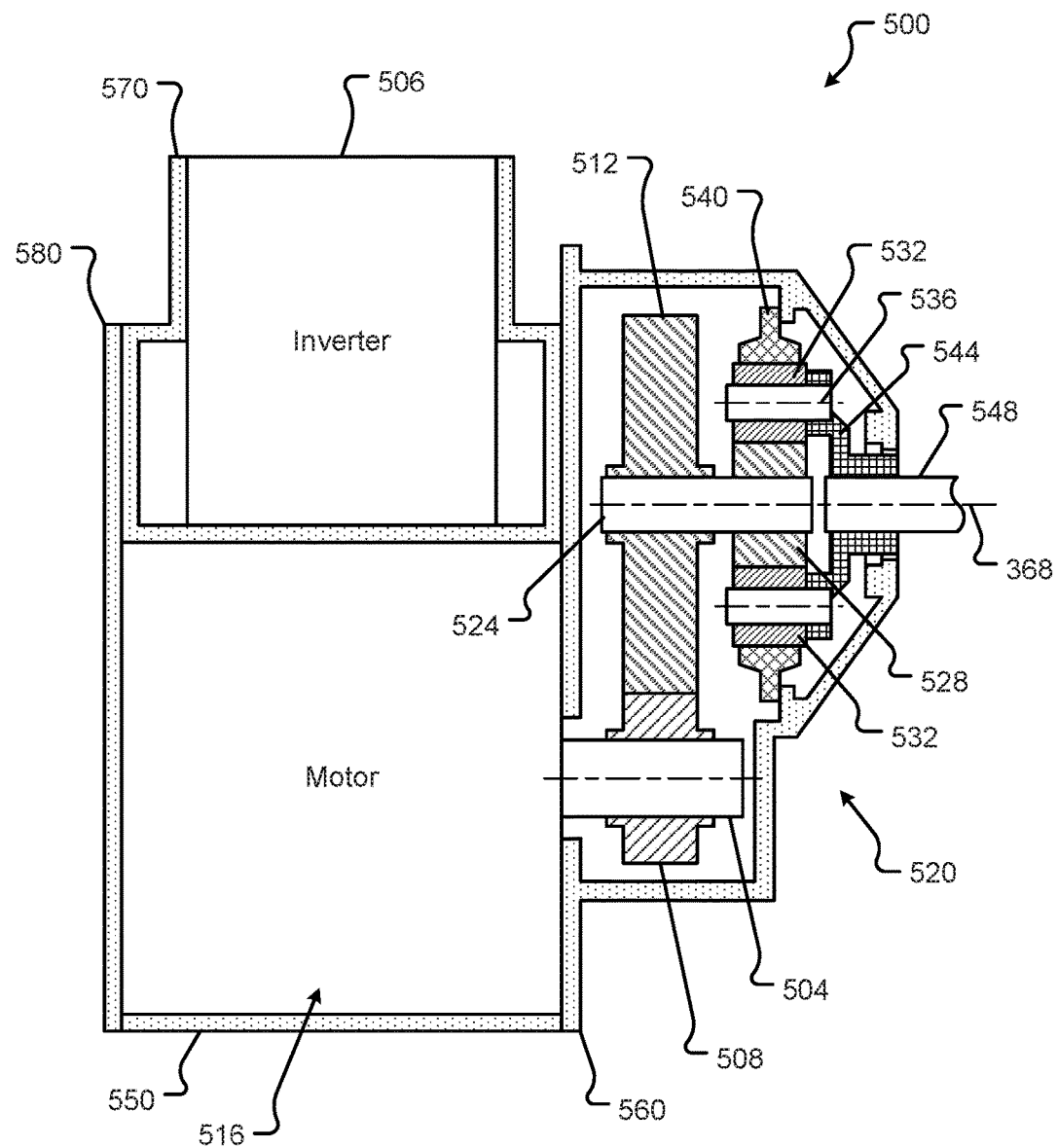
FIG. 5 shows a section view of a motor gearbox unit in accordance with embodiments of the present disclosure.

FIG. 5 shows a section view of a motor gearbox unit 500 in accordance with embodiments of the present disclosure. The motor gearbox unit 500 of FIG. 5 may be similar, if not identical, to the motor gearbox units 130, 130A-D as described in conjunction with FIGS. 1-3. The motor gearbox unit 500 may include an electric motor 516 mechanically interconnected to a gearbox 520 via a motor drive shaft 504. As can be appreciated, the motor 516 may be similar, if not identical, to the motor 216 described in conjunction with FIGS. 1-3. In some embodiments, the motor gearbox unit 500 may include an inverter 506 that receives DC power and outputs AC power to the motor 516. The inverter 506 may serve to regulate the power fed to the motor 516.

The motor gearbox unit 500 may include a motor 516 having a motor drive shaft 504 that is offset from a gearbox power output shaft 548. For instance, the motor 516 and the motor drive shaft 504 may be arranged close to, or in contact with, a base 550 of the motor gearbox unit 500, while the gearbox 520 may be arranged further apart, or offset, from the base 550 of the motor gearbox unit 500. Among other things, this arrangement may provide a lower center of gravity for the motor gearbox unit 500 (the motor comprising the greatest mass of the unit 500) and thus provide increased stability for a vehicle 100 (as the base 550 of the motor gearbox unit 500 may be maintained in contact with a portion of the frame 102 of the vehicle 100). In some embodiments, the power output shaft 548 of the gearbox 520 may be offset in a first direction from the motor drive shaft 504 by a distance, for example, the vertical direction shown in FIG. 5. Additionally or alternatively, the gearbox power output shaft 548 may be offset in a second direction from the motor drive shaft 504, for example, the horizontal direction shown in FIG. 5. In one embodiment, the gearbox power output shaft 548 may be offset in a third direction from the motor drive shaft 504 such that the output shaft axis 368 is offset in a direction into, or out of, the page a distance from the axis of the motor drive shaft 504. In any event, the offset may be set based on an arrangement of the gears in the gearbox 520.

As shown in FIG. 5, the motor drive shaft 504 may be directly connected to a drive gear 508. The drive gear 508 meshes with the intermediate driven gear 512 which is configured to rotate about the intermediate shaft 524. Power transmitted to the intermediate driven gear 512 may be caused to further transmit to an epicyclic reducer or other gear set. The epicyclic reducer can be a planetary, a star or a sun configuration. As shown in FIG. 5, the gear set may be a planetary stage reducer.

In some embodiments, the intermediate shaft may 524 and sun gear 528 may be directly connected to (e.g., bolted, welded, press-fit, spline, keyed, etc.), or indirectly coupled with (e.g., via an additional shaft, special coupling, intermediate gears, etc.), the drive gear 508. Among other things, this arrangement allows the sun gear 528 to rotate in conjunction with the drive gear 508 (e.g., at the same or at a different speed, etc.). The sun gear 528 may engage with one or more planet gears 532 disposed around the sun gear 528. Each of the planet gears 532 may remain in constant mesh, or rotational contact, with both the sun gear 528 and the ring gear 540. For instance, the sun gear 528 may include teeth disposed at an outer diameter and along a periphery of the sun gear 528, while the ring gear 540 may include teeth disposed at an inner diameter and along an internal periphery of the ring gear 540, the planet gears 532 being disposed between the sun gear 528 and the ring gear 540. The planet gears 532 may be configured to rotate about planet gear shafts 536 that are interconnected with a carrier 544. In some embodiments, rotation of the sun gear 528 may impart a rotational force through the planet gears 532 to the carrier 544, causing the carrier 544 to rotate about the output shaft axis 368. For example, the carrier 544 may be connected to the power output shaft 548 of the gearbox 520 that rotates about the output shaft axis 368.

In some embodiments, at least one drive wheel 104A-D may be connected to the power output shaft 548 of the gearbox 520. As can be appreciated, the power output shaft 548 may correspond to one or more of the drive axles 106, 108, 112, 116 described in conjunction with FIGS. 1-3. In some embodiments, the power output shaft 548 and/or drive axles 106, 108, 112, 116 may be configured as drive half-shafts that are connected directly to the carrier 544 via a splined interconnection or through joint races directly machined into an inner diameter of the carrier 544.

The motor gearbox unit 500 may include a base 550, a gearbox housing 560, an inverter housing 570, and/or a motor housing 580 or end plate. In some embodiments, one or more of the inverter 506, motor 516, and/or gearbox 520 may share a portion of a housing with each other and/or another component of the motor gearbox unit 500. In one embodiment, an integral or unified housing may be employed to efficiently route coolant lines, electrical interconnections, and/or save weight, space, and/or the number of required interconnections (e.g., fasteners, joints, etc.).

Figure 6:
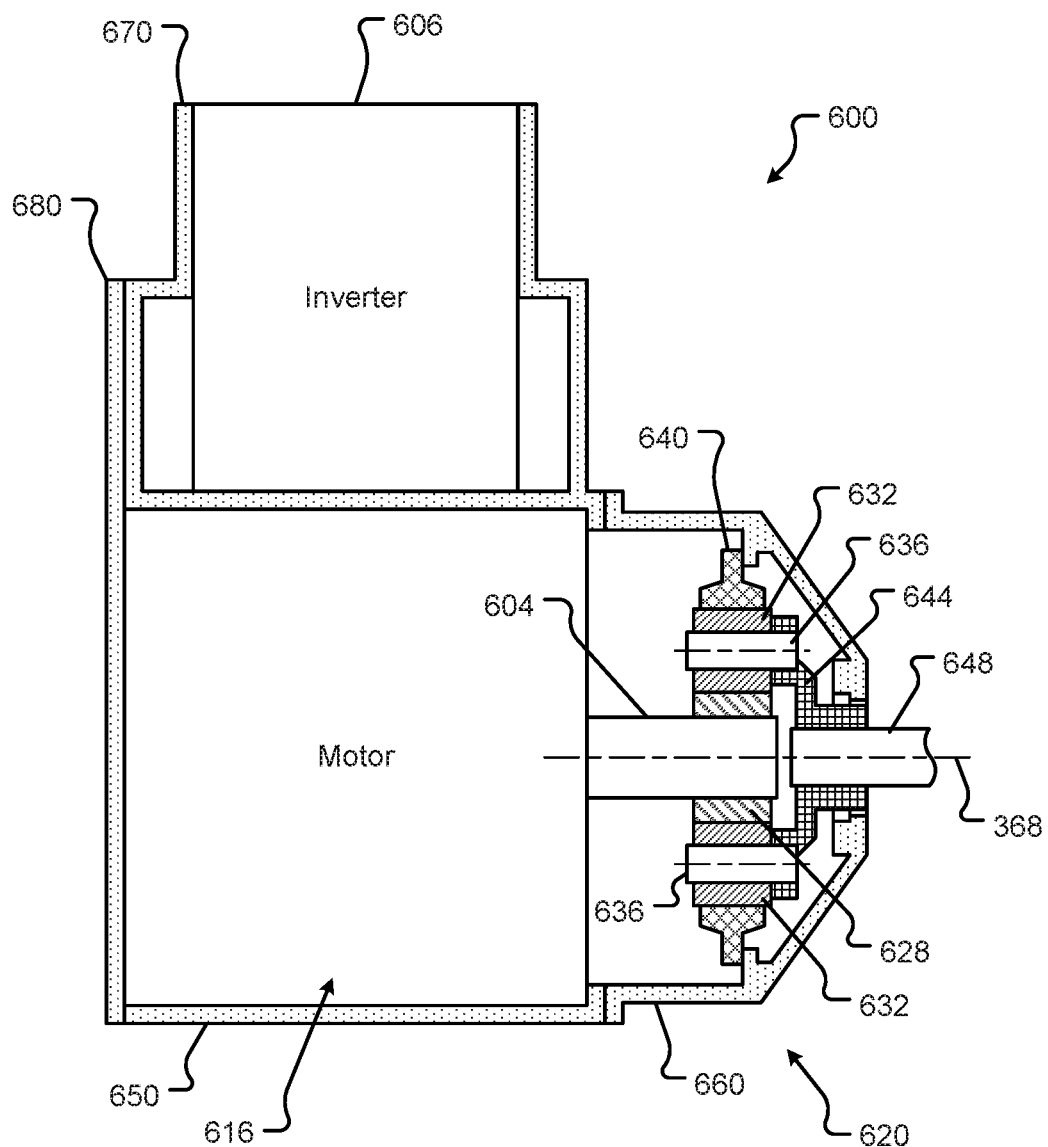
FIG. 6 shows a section view of a motor gearbox unit in accordance with embodiments of the present disclosure.

FIG. 6 shows a section view of a motor gearbox unit 600 in accordance with embodiments of the present disclosure. The motor gearbox unit 600 of FIG. 6 may be similar, if not identical, to the motor gearbox units 130, 130A-D as described in conjunction with FIGS. 1-3 and may include one or more features described in conjunction with the motor gearbox unit 500 FIG. 5. The motor gearbox unit 600 may include an electric motor 616 mechanically interconnected to a gearbox 620 via a motor drive shaft 604. As can be appreciated, the motor 616 may be similar, if not identical, to the motors 216, 516 described in conjunction with FIGS. 1-3, and 5. In some embodiments, the motor gearbox unit 600 may include an inverter 606 that receives DC power and outputs AC power to the motor 616. The inverter 606 may serve to regulate the power fed to the motor 616.

The motor gearbox unit 600 may include a motor 616 having a motor drive shaft 604 that is coaxial with a gearbox power output shaft 648. For instance, the motor drive shaft 604 may be arranged in-line with the power output shaft 648 of the gearbox 620. In this configuration, the axis of the motor drive shaft 604 may be colinear, and/or coaxial, with the output shaft axis 368 of the gearbox 620.

As shown in FIG. 6, the motor drive shaft 604 may be directly connected to an epicyclic reducer or other gear set. The epicyclic reducer can be a planetary, a star, or a sun configuration (e.g., a planetary stage reducer, etc.). For instance, the motor drive shaft 604 may be connected to a sun gear 628 that rotates in concert with the motor drive shaft 604. In some embodiments, the sun gear 628 may be directly connected to (e.g., bolted, welded, press-fit, spline, keyed, etc.), or indirectly coupled with (e.g., via an additional shaft, special coupling, intermediate gears, etc.), the drive shaft 604. The sun gear 628 may engage with one or more planet gears 632 disposed around the sun gear 628.

Each of the planet gears 632 may remain in constant mesh, or rotational contact, with both the sun gear 628 and the ring gear 640. For instance, the sun gear 628 may include teeth disposed at an outer diameter and along a periphery of the sun gear 628, while the ring gear 640 may include teeth disposed at an inner diameter and along an internal periphery of the ring gear 640, the planet gears 632 being disposed between the sun gear 628 and the ring gear 640. The planet gears 632 may be configured to rotate about planet gear shafts 636 that are interconnected with a carrier 644. In some embodiments, rotation of the sun gear 628 may impart a rotational force through the planet gears 632 to the carrier 644, causing the carrier 644 to rotate about the output shaft axis 368. For example, the carrier 644 may be connected to the power output shaft 648 of the gearbox 620 that rotates about the output shaft axis 368.

In some embodiments, at least one drive wheel 104A-D may be connected to the power output shaft 648 of the gearbox 620. As can be appreciated, the power output shaft 648 may correspond to one or more of the drive axles 106, 108, 112, 116 described in conjunction with FIGS. 1-3. In some embodiments, the power output shaft 648 and/or drive axles 106, 108, 112, 116 may be configured as drive half-shafts that are connected directly to the carrier 644 via a splined interconnection or through joint races directly machined into an inner diameter of the carrier 644.

The motor gearbox unit 600 may include a base 650, a gearbox housing 660, an inverter housing 670, and/or a motor housing 680 or end plate. In some embodiments, one or more of the inverter 606, motor 616, and/or gearbox 620 may share a portion of a housing with each other and/or another component of the motor gearbox unit 600. In one embodiment, an integral or unified housing may be employed to efficiently route coolant lines, electrical interconnections, and/or save weight, space, and/or the number of required interconnections (e.g., fasteners, joints, etc.).

FIGS. 7A-7F show various views of a compact side-by-side motor gearbox unit 700 in accordance with embodiments of the present disclosure. The compact side-by-side motor gearbox unit 700 includes two independent motors 716A, 716B arranged adjacent to one another along a common plane running through the center of each motor 716A, 716B and drive shaft 704A, 704B. In this arrangement, the drive shaft 704A of the first motor 716A is oriented, or facing, a direction opposite that of the drive shaft 704B of the second motor 716B. More specifically, the end of the drive shaft 704A including a drive gear 708A of the first motor 716A is oriented facing a direction opposite the end of the drive shaft 704B including a drive gear 708B of the second motor 716B. In some embodiments, the axis of each drive shaft 704A, 704B may be parallel to, and offset from one another by a specific distance, such that the axes of the drive shafts 704A, 704B are not coaxial or colinear with one another. Among other things, the compact side-by-side motor gearbox unit 700 provides a compact packaging of two independent motor gearbox units as an integrated high power density torque vectoring e-drive axle.

Figure 7A:
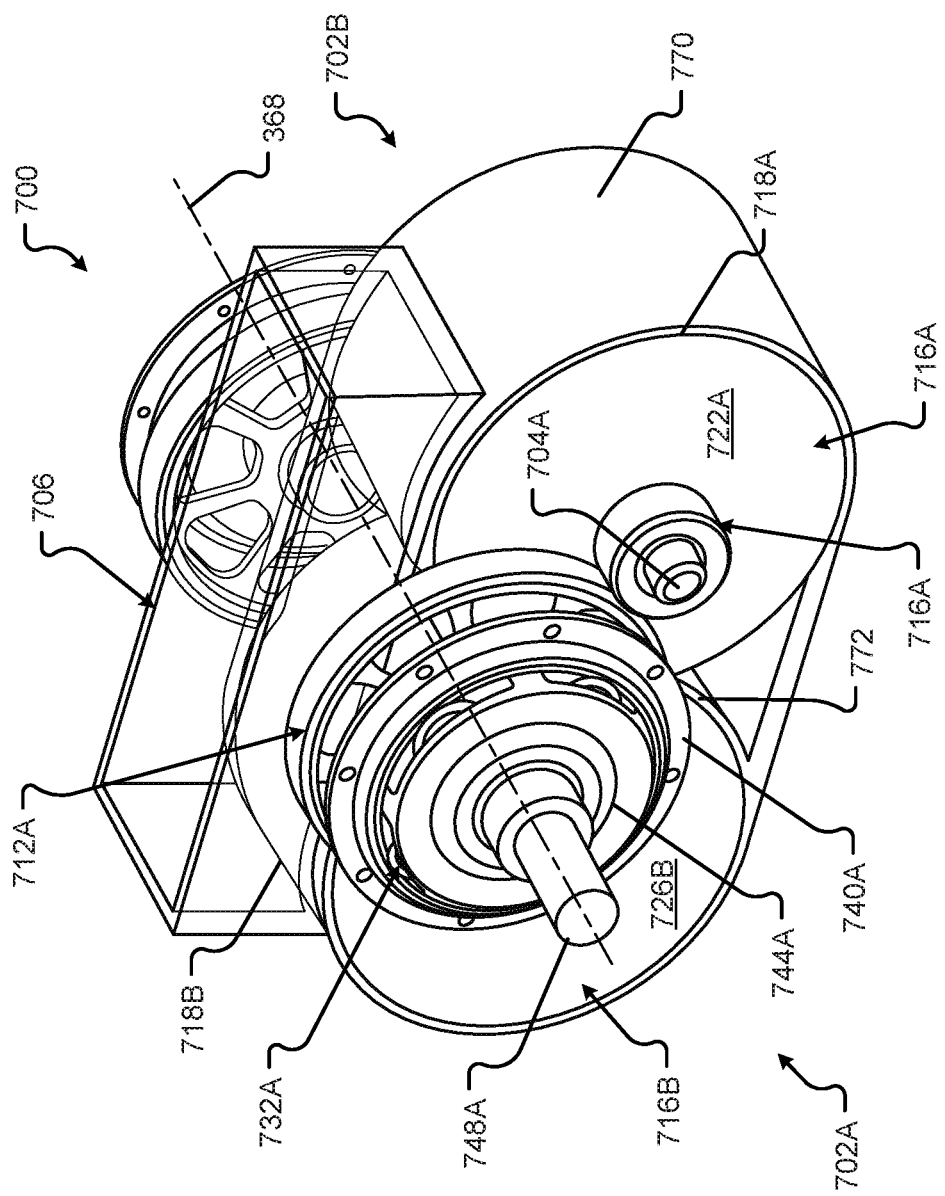
FIG. 7A shows a perspective view of a compact side-by-side motor gearbox unit in accordance with embodiments of the present disclosure.

In one embodiment, all of the components for each motor 716A, 716B and gearbox 720A, 720B may be identical, positioned symmetrically about a central vertical axis 790. This axis of symmetry 790 is illustrated in FIGS. 7C-7E. In one embodiment, the two independent motors 716A, 716B may be located side-by-side and in opposite directions, where a first motor 716A may be configured to drive at least one of the wheels 104A, 104C on a first side (e.g., the left side, etc.) of the vehicle 100 through its own gearbox 720A, and the second motor 716B may be configured to drive at least another wheel 104B, 104D on a second side (e.g., the right side, etc.) of the vehicle 100 through an identical, but oppositely mounted, gearbox 720B.

In some cases, the gearboxes 720A, 720B may be double-stage, single-speed type. For instance, the first stage may be a parallel shaft meshing with the drive gear 704A, 704B directly connected to the motor 716A, 716B. The drive gears 704A, 704B of both gearboxes 720A, 720B, may be symmetrical and 180 degrees to one another, while the power output coupling of each gearbox 720A, 720B may share a common power output axis 368. Additionally or alternatively, this centerline or axis 368 may be the centerline of the half-shafts or drive axles 106, 108, 112, 116 connected to the gearbox 720A, 720B. In one embodiment, the second stage is an epicyclic reducer. The epicyclic reducer can be a planetary, a star, or a sun configuration. As shown in FIGS. 7A-7F, the second stage may include a planetary stage reducer.

In some embodiments, the intermediate shaft may 724A, 724B and sun gear 728A, 728B may be directly connected to (e.g., bolted, welded, press-fit, spline, keyed, etc.), or indirectly coupled with (e.g., via an additional shaft, special coupling, intermediate gears, etc.), the drive gear 708A, 708B, respectively. Among other things, this arrangement allows each sun gear 728A, 728B to rotate in conjunction with the respective drive gear 708A, 708B (e.g., at the same or at a different speed, etc.). The sun gear 728A, 728B may engage with one or more planet gears 732A, 732B disposed around the respective sun gear 728A, 728B. Each of the planet gears 732A, 732B may remain in constant mesh, or rotational contact, with both the sun gear 728A, 728B and the ring gear 740A, 740B. For instance, the sun gear 728A, 728B may include teeth disposed at an outer diameter and along a periphery of the sun gear 728A, 728B, while the ring gear 740A, 740B may include teeth disposed at an inner diameter and along an internal periphery of the ring gear 740A, 740B, the planet gears 732A, 732B being disposed between the sun gear 728A, 728B and the ring gear 740A, 740B. The planet gears 732A, 732B may be configured to rotate about planet gear shafts 736A, 736B that are interconnected with a respective carrier 744A, 744B. In some embodiments, rotation of the sun gear 728A, 728B may impart a rotational force through the planet gears 732A, 732B to their respective carrier 744A, 744B, causing the carrier 744A, 744B to rotate about the output shaft axis 368. For example, the first carrier 744A may be connected to the power output shaft 748A of the first gearbox 720A that rotates about the output shaft axis 368 and the second carrier 744B may be connected to the power output shaft 748B of the second gearbox 720B that rotates about the output shaft axis 368. It should be appreciated that while shown as including a power output shaft 748A, 748B, each gearbox 720A, 720B of the compact side-by-side motor gearbox unit 700 may comprise any type of power output coupling including, but in no way limited to, a receptacle, a clamp, a splined interconnection, a joint, a keyed shaft, a keyed hole, etc., and/or combinations thereof.

As described above, the compact side-by-side motor gearbox unit 700 may include two motor gearbox interconnections, each including a motor 716A, 716B having a motor drive shaft 704A, 704B that is offset from a gearbox power output shaft 748A, 748B, respectively. For instance, the first motor 716A and the first motor drive shaft 704A may be arranged close to, or in contact with, a base of the housing 770 of the compact side-by-side motor gearbox unit 700, while the gearbox 720A may be arranged further apart, or offset, from the base of the housing 770 of the compact side-by-side motor gearbox unit 700. Among other things, this arrangement may provide a lower center of gravity for the compact side-by-side motor gearbox unit 700 (the motor 716A and motor body 718 comprising the greatest mass of the unit 700) and thus provide increased stability for a vehicle 100. For example, the base of the housing 770 of the compact side-by-side motor gearbox unit 700 may be maintained in contact with a portion of the frame 102 of the vehicle 100. The second motor 716B and gearbox 720B may be similarly, if not identically, arranged on the opposite side of the housing 770.

Figure 7B:
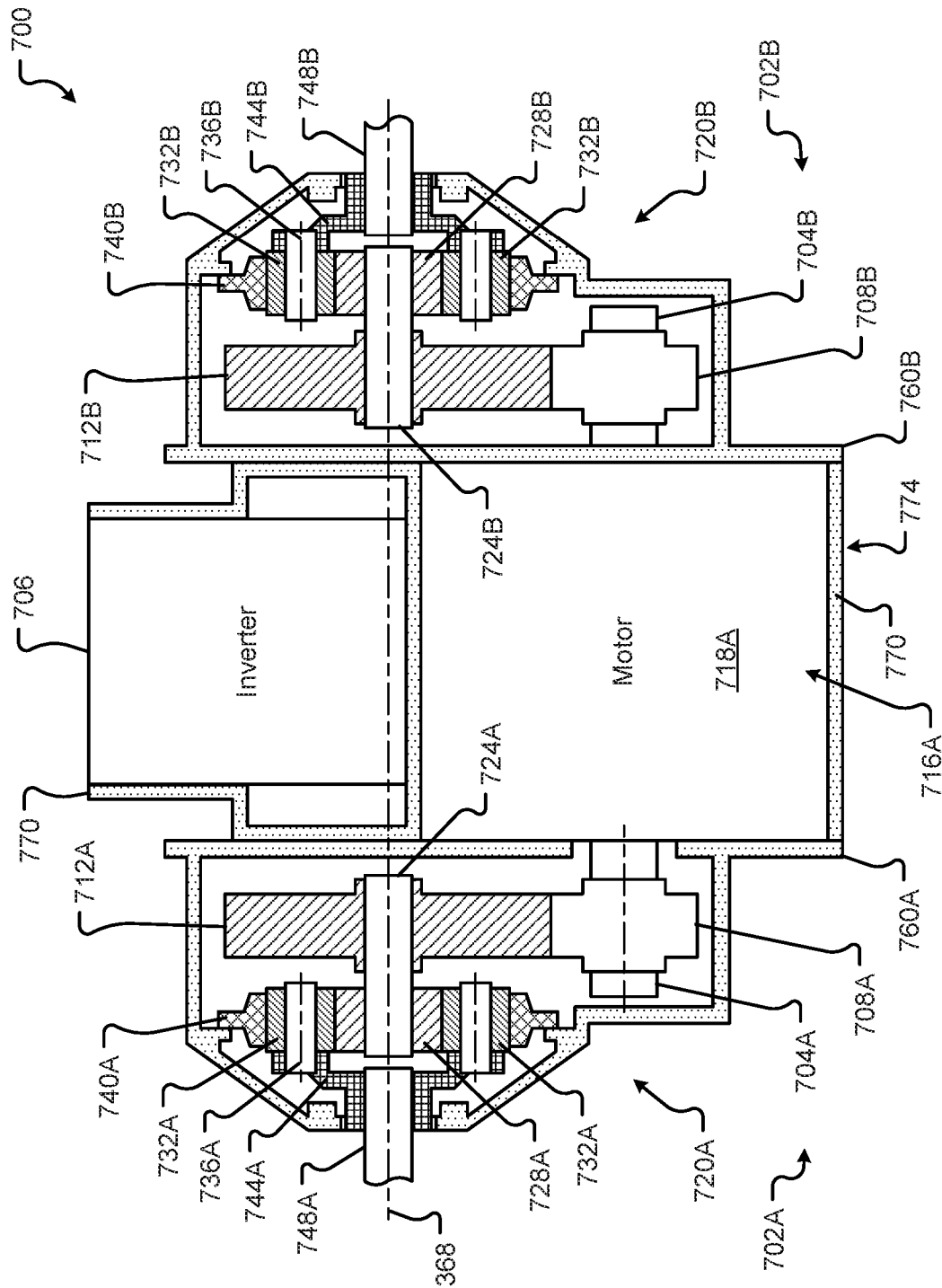
FIG. 7B shows a section view of the compact side-by-side motor gearbox unit in accordance with embodiments of the present disclosure.
Figure 7C:
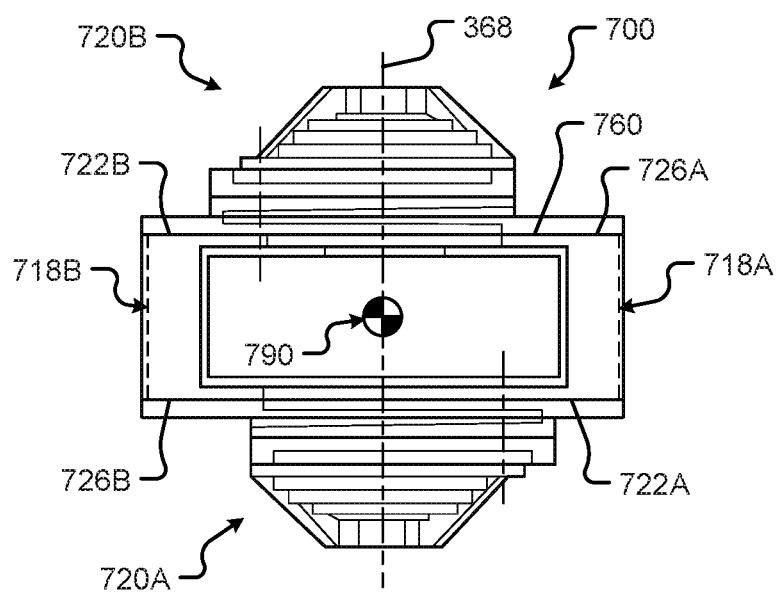
FIG. 7C shows a plan view of the compact side-by-side motor gearbox unit in accordance with embodiments of the present disclosure.
Figure 7D:
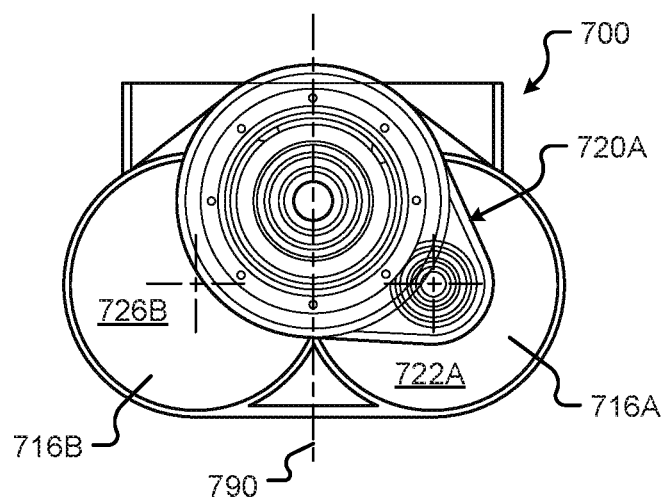
FIG. 7D shows a first elevation view of the compact side-by-side motor gearbox unit in accordance with embodiments of the present disclosure.
Figure 7E:
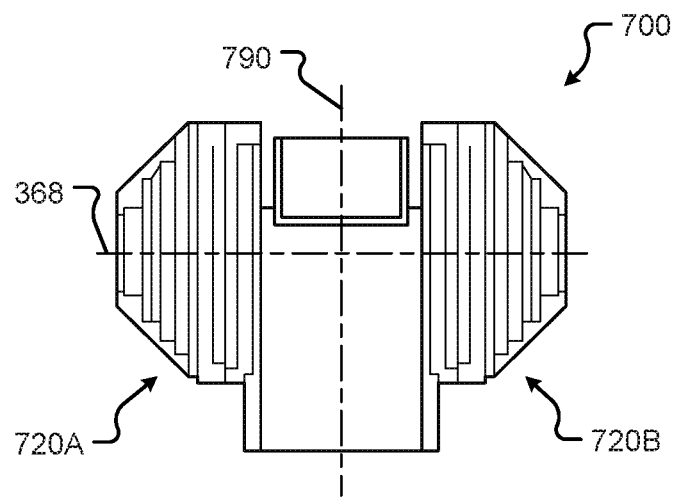
FIG. 7E shows a second elevation view of the compact side-by-side motor gearbox unit in accordance with embodiments of the present disclosure.
Figure 7F:
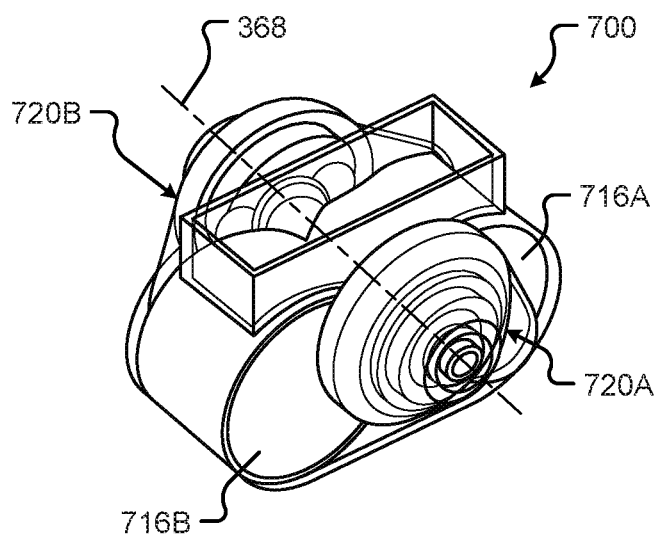
FIG. 7F shows a perspective view of the compact side-by-side motor gearbox unit in accordance with embodiments of the present disclosure.

In some embodiments, a first power output shaft 748A of the first gearbox 720A may be offset in a first direction from the first motor drive shaft 704A by a distance, for example, the vertical direction shown in FIG. 7B. The second power output shaft 748B of the second gearbox 720B may be offset in the same first direction from the first motor drive shaft 704A and the second motor drive shaft 704B, as both the first and second motor drive shafts 704A, 704B may be coplanar with one another in the housing 770. Additionally or alternatively, the gearbox power output coupling and/or shaft 748A, 748B of each gearbox 720A, 720B may be aligned with a center of the compact side-by-side motor gearbox unit 700 and offset in a second direction from each motor drive shaft 704A, 704B, respectively (e.g., the horizontal direction shown in FIG. 7B). In one embodiment, the first gearbox power output coupling or shaft 748A may be offset in a third direction from the first motor drive shaft 704A, such that the output shaft axis 368 is offset in a direction (e.g., into the page of FIG. 7B) a distance from the axis of the first motor drive shaft 704A, while the second gearbox power output coupling or shaft 748B may be offset in a an opposite direction from the second motor drive shaft 704B (e.g., out of the page of FIG. 7), such that each power output coupling or shaft 748A, 748B is colinear with the shared output shaft axis 368. The offset distance between the first gearbox 720A and the first motor drive shaft 704A and the offset distance between the second gearbox 720B and the second motor drive shaft 704B may be defined, or set, based on a size and/or an arrangement of the gears in each gearbox 720A, 720B, respectively.

In some embodiments, at least one drive wheel 104A-D may be connected to the first power output shaft 748A of the first gearbox 720A. Additionally or alternatively, at least one other drive wheel 104A-D may be connected to the second power output shaft 748B of the second gearbox 720B. In any event, the power output shafts 748A, 748B may correspond to one or more of the drive axles 106, 108, 112, 116 described in conjunction with FIGS. 1-3. In some embodiments, the power output shafts 748A, 748B and/or drive axles 106, 108, 112, 116 may be configured as drive half-shafts that are connected directly to a respective carrier 744A. 744B via a splined interconnection or through joint races directly machined into an inner diameter of the carrier 744A, 744B.

In some embodiments, the compact side-by-side motor gearbox unit 700 may include two independent motors 716A, 716B, each including an offset gearbox 720A, 720B having a shared power output shaft axis 368. For instance, a first drive gear 708A and first gearbox 720A associated with a first motor 716A may be disposed on a first side 702A of a housing 770, while a second drive gear 708B and second gearbox 720B associated with a second motor 716B may be disposed on a second side 702B of the housing 770. In some embodiments, the first and second motors 716A, 716B may each be arranged with their respective gearboxes 720A, 720B similarly, if not identically, to the motor 516 and gearbox 520 arrangement described in conjunction with FIG. 5.

In one embodiment, the compact side-by-side motor gearbox unit 700 and/or each motor 716A, 716B and gearbox 720A, 720B may include one or more features, components, relationships, orientations, etc., as described in conjunction with the motor gearbox unit 500 of FIG. 5. Additionally or alternatively, the compact side-by-side motor gearbox unit 700 of FIGS. 7A-7F may be similar, if not identical, to the motor gearbox units 130, 130A-D as described in conjunction with FIGS. 1-3. The compact side-by-side motor gearbox unit 700 may include a first and second electric motor 716A, 716B mechanically interconnected to a gearbox 720A, 720B via a motor drive shaft 704A, 704B, respectively. As can be appreciated, the motors 716A, 716B may be similar, if not identical, to the motor 216 described in conjunction with FIGS. 1-3. In some embodiments, the compact side-by-side motor gearbox unit 700 may include at least one inverter 706 that receives DC power and outputs AC power to the one or more of the motors 716A, 716B. The inverter 706 may serve to regulate the power fed to one or both of the motors 716A, 716B. In some embodiments, the compact side-by-side motor gearbox unit 700 may include a dual inverter, or two inverters, such that each motor 716A, 716B is provided with its own inverter.

In one embodiment, the compact side-by-side motor gearbox unit 700 may be configured to maximize half-shaft lengths and reduce the packaging size (e.g., overall dimensions, length×width×height, etc.) of the compact side-by-side motor gearbox unit 700 in the vehicle. Among other things, this unique packaging provides a high power density and lower position (e.g., lowering the center of gravity of the vehicle, etc.) of the compact side-by-side motor gearbox unit 700, which can result in improved vehicle dynamics. An additional benefit of the compact side-by-side motor gearbox unit 700 includes torque vectoring of the axle based on utilizing two independent motors 716A, 716B.

Referring to FIG. 7A, a perspective view of a compact side-by-side motor gearbox unit 700 is shown in accordance with embodiments of the present disclosure. As shown in FIG. 7A, the gearbox housings 760A, 760B associated with each side 702A, 702B of the housing 770 are removed (for clarity) and a schematic gear set between the first motor 716A and the first power output shaft 748A is illustrated. While any gear ratio, set, or arrangement may be disposed between the drive shaft 704A and the power output shaft 748A, the gear set of FIG. 7A is configured as an epicyclic reducer. Moreover, while shown including a power output shaft 748A, it should be appreciated that the compact side-by-side motor gearbox unit 700 may include any type of power output coupling disposed on opposite sides 702A, 702B of the housing 770 and sharing a common power output axis 368.

The first motor 716A, as illustrated in FIG. 7A, includes a first drive shaft 704A extending from a front face 722A of the first motor 716A and away from a center of the compact side-by-side motor gearbox unit 700. In some embodiments, the front face 722A of the first motor 716A may be substantially coincident, or coplanar, with the rear face 726B of the second motor 716B in the housing 770. In one embodiment, the front face 722A of the first motor 716A may be adjacent to and offset from the rear face 726B of the second motor 716B in the housing 770, such that the front face 722A of the first motor 716A is closer (in distance) to the rear face 726B of the second motor 716B than the front face 722B of the second motor. In any event, the front face 722A of the first motor 716A may be facing a first direction while the front face 722B of the second motor 716B may be facing a second direction opposite the first direction.

In some embodiments, the first and second motors 716A, 716B may be packaged at least partially inside the housing 770 such that the first gearbox 720A is spaced apart from the second gearbox 720B along the shared power output axis 368 by a distance substantially equal to a length of a single motor 716A, 716B (e.g., including clearances, minimal housing dimensions, and/or wall thicknesses, etc.). This compact arrangement may provide for additional space in the drivetrain of the vehicle 100. In one embodiment, the first and second motors 716A, 716B may be disposed side-by-side in the housing 770, separated by a wall 772 or material thickness of the housing 770. The housing 770 may include one or more receptacles, receiving cavities, or other volumes configured to at least partially receive and/or contain the first and second motors 716A, 716B and/or a portion of the motor body 718A, 718B.

Each gearbox 720A, 720B may include a separate gearbox housing 760A, 760B, respectively. The gearbox housings 760A, 760B may be configured to at least partially contain one or more elements, gears, shafts, and/or couplings of each gearbox 720A, 720B. In some embodiments, the gearbox housings 760A, 760B may be attached to, or otherwise interconnected with, the housing 770 of the motors 716A, 716B.

The compact side-by-side motor gearbox unit 700 may include an inverter 706 attached thereto. In one embodiment, the compact side-by-side motor gearbox unit 700 may include dual inverter, separate inverters for each motor, and/or other motor drive unit(s). The inverter 706 may be received by an inverter housing separate from or integrated with the housing 770 of the motors 716A, 716B or compact side-by-side motor gearbox unit 700. The inverter 706 may share a portion of the housing 770, a motor gearbox unit cooling system, cooling elements, electrical interconnections, and/or some other part of the compact side-by-side motor gearbox unit 700. In some embodiments, the inverter 706 may be mounted between the gearboxes 720A, 720B. Additionally or alternatively, the inverter 706 may be mounted directly above a portion of the motors 716A, 716B. The inverter 706 may be sized to sit above the motors 716A, 716B and below, or flush with, an uppermost portion of the gearboxes 720A, 720B or gearbox housings 760A, 760B providing a vertically compact integrated unit 700. In any event, the inverter 706 may be separated from the motors 716A, 716B by a wall thickness of the housing 770.

FIGS. 7B-7F show various views of the compact side-by-side motor gearbox unit 700 with the gearbox housings 760A, 760B or covers attached, in accordance with embodiments of the present disclosure. The compact side-by-side motor gearbox unit 700 may include a central axis of symmetry 790, about which, the motors 716A, 716B and gearboxes 720A, 720B are symmetrically arranged. In some embodiments, the central axis of symmetry 790 may represent an axis defining a location of the center of gravity for the compact side-by-side motor gearbox unit 700. Additionally or alternatively, the shared power output axis 368 may pass perpendicularly to, and even through, the axis of symmetry 790, as illustrated in FIG. 7E.

The compact side-by-side motor gearbox unit 700 offers a number of advantages beyond conventional motor gearbox unit arrangements. For instance, rather than arranging two motor gearbox units such that the motors and drive shafts are in-line, or colinear, with one another, such that each motor gearbox unit is the mirror image of the other through a planar symmetry adding to an overall length or space taken up by the package and/or powertrain elements, the compact side-by-side motor gearbox unit 700 allows the overall space taken up in the drive axle and power output axis 368 direction to be reduced to a minimal length. This minimal length may substantially equal the length of a single motor and two gearboxes rather than the length of two motors and two gearboxes arranged in-line. By reducing the overall package size, the compact side-by-side motor gearbox unit 700 allows the length and inclination of the half-drive shafts (e.g., 106, 108, 112, 116, 748A, 748B, etc.) to be optimized. Moreover, the axis symmetry of the compact side-by-side motor gearbox unit 700 may reduce manufacturing and/or inventory costs as the motors 716A, 716B, the gearboxes 720A, 720B, and even the gearbox housings 760A, 760B may be identical, or substantially similar.

Although represented by gears in the present disclosure, it should be appreciated that the interconnection between one or more of the rotating elements in the motor gearbox units 500, 600, 700, etc. may include, but is in no way limited to, one or more belts, pulleys, chains, fluid contacting surfaces, linkages, and/or combinations thereof.

Any of the steps, functions, and operations discussed herein can be performed continuously and automatically.

The exemplary systems and methods of this disclosure have been described in relation to vehicle systems and electric vehicles. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a motor gearbox unit, comprising: a first electric motor including a first motor body and a first drive shaft extending from a portion of the first motor body; a second electric motor including a second motor body and a second drive shaft extending from a portion of the second motor body, wherein the first electric motor is arranged adjacent to the second electric motor, the first electric motor oriented such that the first drive shaft is disposed facing a first direction and the second electric motor oriented such that the second drive shaft is disposed facing a second direction opposite the first direction, wherein the first drive shaft is not coaxial with the second drive shaft; a first gearbox mechanically interconnected to the first drive shaft; and a second gearbox mechanically interconnected to the second drive shaft, wherein a power output axis of the first gearbox is colinear with a power output axis of the second gearbox.

Aspects of the above motor gearbox unit further comprise: a motor housing comprising first and second receptacles each receptacle sized to receive a portion of an electric motor; wherein the first electric motor is disposed in the first receptacle and the second electric motor is disposed in the second receptacle. Aspects of the above motor gearbox unit include wherein the motor housing includes a first side and a second side opposite the first side, and wherein the first gearbox is disposed on the first side of the motor housing and the second gearbox is disposed on the second side of the motor housing. Aspects of the above motor gearbox unit include wherein the first drive shaft includes a first drive gear attached thereto, and wherein the second drive shaft includes a second drive gear attached thereto. Aspects of the above motor gearbox unit include wherein the first gearbox includes a first power output shaft, the second gearbox includes a different second power output shaft, and the first and second power output shafts are colinear with one another and the power output axes of the first and second gearboxes. Aspects of the above motor gearbox unit further comprise: a first gearbox housing configured to cover at least a portion of the first gearbox, the first gearbox housing attached to the motor housing at the first side of the motor housing; and a second gearbox housing configured to cover at least a portion of the second gearbox, the second gearbox housing attached to the motor housing at the second side of the motor housing. Aspects of the above motor gearbox unit include wherein the first gearbox and the second gearbox each include a planetary gear system mechanically coupled with the first drive shaft and the second drive shaft, respectively. Aspects of the above motor gearbox unit include wherein the first electric motor and the second electric motor are the same size and shape, and wherein the first gearbox and the second gearbox are the same shape and size. Aspects of the above motor gearbox unit further comprise: an inverter electrically interconnected with the first and second electric motor. Aspects of the above motor gearbox unit include wherein the motor housing includes a receptacle configured to position the inverter at a location offset a first distance from a shared plane running through a center of each electric motor and each drive shaft and offset a lesser second distance from the power output axes of the first and second gearboxes.

Embodiments include a motor gearbox unit, comprising: a housing having a first side and a second side opposite the first side, wherein the housing includes a first volume and a second volume, wherein the first volume and the second volume are separated by a wall; a first motor at least partially disposed in the first volume of the housing, the first motor having a drive shaft at least partially extending from the first side of the housing; a second motor at least partially disposed in the first volume of the housing, the second motor having a drive shaft at least partially extending from the second side of the housing; a first gearbox mechanically coupled to the drive shaft of the first motor on the first side of the housing; and a second gearbox mechanically coupled to the drive shaft of the second motor on the second side of the housing, wherein the first gearbox and the second gearbox share a common power output coupling axis that is offset from and not colinear with the drive shaft of the first motor nor the drive shaft of the second motor.

Aspects of the above motor gearbox unit include wherein the drive shaft of the first motor includes a first drive gear attached thereto, and wherein the drive shaft of the second motor includes a drive gear attached thereto. Aspects of the above motor gearbox unit include wherein the first gearbox includes a first power output coupling mechanically coupled via a first gear train to the first drive shaft, the second gearbox includes a different second power output coupling mechanically coupled via a second gear train to the second drive shaft. Aspects of the above motor gearbox unit include wherein the first power output coupling and the second power output coupling are colinear with one another and the common power output coupling axis. Aspects of the above motor gearbox unit further comprise: a first gearbox housing configured to cover at least a portion of the first gearbox, the first gearbox housing attached to the housing at the first side of the housing; and a second gearbox housing configured to cover at least a portion of the second gearbox, the second gearbox housing attached to the housing at the second side of the housing. Aspects of the above motor gearbox unit include wherein the first gear train and the second gear train each include at least one planetary gear system. Aspects of the above motor gearbox unit include wherein the first motor and the second motor are the same size and shape, and wherein the first gearbox and the second gearbox are the same shape and size. Aspects of the above motor gearbox unit further comprise: an inverter electrically interconnected with the first motor and the second motor, wherein the first motor is an alternating current motor, the second motor is an alternating, and wherein the inverter changes direct current power into alternating current power and feeds the alternating current power to the first motor and the second motor via electrical interconnections; and an inverter housing including a surface extending from the first side of the housing including the first motor and the second motor to the second side of the housing including the first motor and the second motor, wherein the inverter housing includes a receptacle configured to position the inverter at a location offset a first distance from a shared plane running through a center of each electric motor and each drive shaft and offset a lesser second distance from the common power output coupling axis of the first and second gearboxes.

Embodiments include a vehicle, comprising: a vehicle chassis frame; two or more drive axles; two or more drive wheels connected to the two or more drive axles; a motor gearbox unit connected to the vehicle chassis frame, the motor gearbox unit comprising: a first electric motor including a first motor body and a first drive shaft extending from a portion of the first motor body; a second electric motor including a second motor body and a second drive shaft extending from a portion of the second motor body, wherein the first electric motor is arranged adjacent to the second electric motor, the first electric motor oriented such that the first drive shaft is disposed facing a first direction and the second electric motor oriented such that the second drive shaft is disposed facing a second direction opposite the first direction, wherein the first drive shaft is not coaxial with the second drive shaft; a first gearbox mechanically interconnected to the first drive shaft; and a second gearbox mechanically interconnected to the second drive shaft, wherein a power output axis of the first gearbox is colinear with a power output axis of the second gearbox; wherein a first drive axle of the two or more drive axles is mechanically attached to a power output coupling of the first gearbox along the power output axis of the first gearbox, and wherein a second drive axle of the two or more drive axles is mechanically attached to a power output coupling of the second gearbox along the power output axis of the second gearbox.

Aspects of the above vehicle include wherein the motor gearbox unit is part of a front or rear wheel drive system of the vehicle, wherein the first electric motor is disposed adjacent to a front of the vehicle and the second electric motor is disposed behind the first electric motor further from the front of the vehicle than the first electric motor, and wherein the first drive axle is connected to a first of two or more drive wheels closest to the front or rear of the vehicle and the second drive axle is connected to a second of the two or more drive wheels closest to the front or rear of the vehicle.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "electric vehicle" (EV), also referred to herein as an electric drive vehicle, may use one or more electric motors or traction motors for propulsion. An electric vehicle may be powered through a collector system by electricity from off-vehicle sources, or may be self-contained with a battery or generator to convert fuel to electricity. An electric vehicle generally includes a rechargeable electricity storage system (RESS) (also called Full Electric Vehicles (FEV)). Power storage methods may include: chemical energy stored on the vehicle in on-board batteries (e.g., battery electric vehicle or BEV), on board kinetic energy storage (e.g., flywheels), and/or static energy (e.g., by on-board double-layer capacitors). Batteries, electric double-layer capacitors, and flywheel energy storage may be forms of rechargeable on-board electrical storage.

The term "hybrid electric vehicle" refers to a vehicle that may combine a conventional (usually fossil fuel-powered) powertrain with some form of electric propulsion. Most hybrid electric vehicles combine a conventional internal combustion engine (ICE) propulsion system with an electric propulsion system (hybrid vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is a vehicle that can run on just the engine, just the batteries, or a combination of both. A mid hybrid is a vehicle that cannot be driven solely on its electric motor, because the electric motor does not have enough power to propel the vehicle on its own.

The term "rechargeable electric vehicle" or "REV" refers to a vehicle with on board rechargeable energy storage, including electric vehicles and hybrid electric vehicles.

What is claimed is:

1. A motor gearbox unit, comprising:
a motor housing comprising a base that mounts to a frame of a vehicle and two motor receptacles formed in the motor housing and arranged side-by-side axially offset from one another;
a first electric motor attached to the motor housing, the first electric motor including a first motor body and a first drive shaft extending from a portion of the first motor body, wherein the first motor body is disposed in a first motor receptacle of the two motor receptacles, wherein the first motor body includes a front face disposed at an end of the first motor body and a rear face disposed at an opposite end of the first motor body, and wherein the first drive shaft lies in a first plane that is substantially parallel to and offset a first distance from the base;

a second electric motor attached to the motor housing, the second electric motor including a second motor body and a second drive shaft extending from a portion of the second motor body, wherein the second motor body is disposed in a second motor receptacle of the two motor receptacles, wherein the second motor body includes a front face disposed at an end of the second motor body and a rear face disposed at an opposite end of the second motor body, wherein the second drive shaft lies in the first plane, wherein the first electric motor is arranged adjacent to the second electric motor, the first electric motor oriented such that the first drive shaft is disposed facing a first direction and the second electric motor oriented such that the second drive shaft is disposed facing a second direction opposite the first direction, wherein the first drive shaft is not coaxial with the second drive shaft, and wherein the front face of the first motor body is substantially coplanar with the rear face of the second motor body and the front face of the second motor body is substantially coplanar with the rear face of the first motor body;

a first gearbox mechanically interconnected to the first drive shaft; and a second gearbox mechanically interconnected to the second drive shaft, wherein a power output axis of the first gearbox is colinear with a power output axis of the second gearbox, wherein the power output axis of the first gearbox and the power output axis of the second gearbox lie in a second plane that is substantially parallel to and offset a second distance from the base, and wherein the second distance is greater than the first distance.

2. The motor gearbox unit of claim 1, wherein the motor housing comprises a first side and a second side opposite the first side, wherein each of the two motor receptacles pass through the motor housing from the first side to the second side of the motor housing, wherein the front face of the first motor body is substantially coplanar with the first side of the motor housing, and wherein the front face of the second motor body is substantially coplanar with the second side of the motor housing.

3. The motor gearbox unit of claim 2, wherein the first gearbox is disposed on the first side of the motor housing and the second gearbox is disposed on the second side of the motor housing, and wherein the first gearbox and the second gearbox are spaced apart from one another by a distance substantially equal to a length of a single electric motor.

4. The motor gearbox unit of claim 3, wherein the first drive shaft includes a first drive gear attached thereto, and wherein the second drive shaft includes a second drive gear attached thereto.

5. The motor gearbox unit of claim 4, wherein the first gearbox includes a first power output shaft, the second gearbox includes a different second power output shaft, and the first and second power output shafts are colinear with one another and the power output axes of the first and second gearboxes.

6. The motor gearbox unit of claim 4, further comprising:
a first gearbox housing configured to cover at least a portion of the first gearbox, the first gearbox housing attached to the motor housing at the first side of the motor housing; and a second gearbox housing configured to cover at least a portion of the second gearbox, the second gearbox housing attached to the motor housing at the second side of the motor housing.

7. The motor gearbox unit of claim 4, wherein the first gearbox and the second gearbox each include a planetary gear system mechanically coupled with the first drive shaft and the second drive shaft, respectively.

8. The motor gearbox unit of claim 4, wherein the first electric motor and the second electric motor are the same size and shape, and wherein the first gearbox and the second gearbox are the same shape and size.

9. The motor gearbox unit of claim 4, further comprising:
an inverter electrically interconnected with the first and second electric motor.

10. The motor gearbox unit of claim 9, wherein the motor housing includes an inverter receptacle disposed between the first side of the motor housing and the second side of the motor housing, the inverter receptacle configured to receive the inverter in a space between the first and second sides of the motor housing and position the inverter at a location offset a third distance from a shared plane running through a center of each electric motor and each drive shaft and offset a lesser fourth distance from the power output axes of the first and second gearboxes.

11. A motor gearbox unit, comprising:
a housing having a first side and a second side opposite the first side, the first side and second side separated by a base that mounts to a frame of a vehicle, wherein the housing includes a first volume and a second volume formed therein and arranged side-by-side axially offset from one another, wherein the first volume and the second volume are separated by a wall extending between the first and second sides of the housing;

a first motor at least partially disposed in the first volume of the housing, the first motor having a drive shaft at least partially extending from the first side of the housing, the first motor having a front face disposed at an end of the first motor and a rear face disposed at an opposite end of the first motor, wherein the drive shaft of the first motor lies in a first plane that is substantially parallel to and offset a first distance from the base;

a second motor at least partially disposed in the first volume of the housing, the second motor having a drive shaft at least partially extending from the second side of the housing, the second motor having a front face disposed at an end of the second motor and a rear face disposed at an opposite end of the second motor, wherein the drive shaft of the second motor lies in a first plane that is substantially parallel to and offset a first distance from the base;

a first gearbox mechanically coupled to the drive shaft of the first motor on the first side of the housing; and a second gearbox mechanically coupled to the drive shaft of the second motor on the second side of the housing, wherein the first gearbox and the second gearbox are spaced apart from one another by a distance substantially equal to a length of a single electric motor, wherein the first gearbox and the second gearbox share a common power output coupling axis that is offset from and not colinear with the drive shaft of the first motor nor the drive shaft of the second motor, and wherein the front face of the first motor is substantially coplanar with the rear face of the second motor and the front face of the second motor is substantially coplanar with the rear face of the first motor, wherein the common power output coupling axis lies in a second plane that is substantially parallel to and offset a second distance from the base, and wherein the second distance is greater than the first distance.

12. The motor gearbox unit of claim 11, wherein the drive shaft of the first motor includes a first drive gear attached thereto, and wherein the drive shaft of the second motor includes a drive gear attached thereto.

13. The motor gearbox unit of claim 12, wherein the first gearbox includes a first power output coupling mechanically coupled via a first gear train to the first drive shaft, the second gearbox includes a different second power output coupling mechanically coupled via a second gear train to the second drive shaft.

14. The motor gearbox unit of claim 13, wherein the first power output coupling and the second power output coupling are colinear with one another and the common power output coupling axis.

15. The motor gearbox unit of claim 14, further comprising:
a first gearbox housing configured to cover at least a portion of the first gearbox, the first gearbox housing attached to the housing at the first side of the housing; and
a second gearbox housing configured to cover at least a portion of the second gearbox, the second gearbox housing attached to the housing at the second side of the housing.

16. The motor gearbox unit of claim 14, wherein the first gear train and the second gear train each include a planetary gear system, and wherein the planetary gear system of the first gear train and the second gear train is coaxial with the common power output coupling axis.

17. The motor gearbox unit of claim 14, wherein the first motor and the second motor are the same size and shape, and wherein the first gearbox and the second gearbox are the same shape and size.

18. The motor gearbox unit of claim 14, further comprising:
an inverter electrically interconnected with the first motor and the second motor, wherein the first motor is an alternating current motor, the second motor is an alternating current motor, and wherein the inverter changes direct current power into alternating current power and feeds the alternating current power to the first motor and the second motor via electrical interconnections; and
an inverter housing including a surface extending from the first side of the housing including the first motor and the second motor to the second side of the housing including the first motor and the second motor, wherein the inverter housing includes a receptacle disposed between the front face of the first motor and the front face of the second motor, the inverter disposed in the receptacle and contained in a space between the first and second sides of the housing, the inverter positioned in the receptacle at a location offset a third distance from a shared plane running through a center of each electric motor and each drive shaft and offset a lesser fourth distance from the common power output coupling axis of the first and second gearboxes.

19. A vehicle, comprising:
a vehicle chassis frame;
two or more drive axles;
two or more drive wheels connected to the two or more drive axles;
a motor gearbox unit connected to the vehicle chassis frame, the motor gearbox unit comprising:
a motor housing comprising a base that mounts to the vehicle chassis frame and two motor receptacles formed in the motor housing and arranged side-by-side axially offset from one another;
a first electric motor attached to the motor housing, the first electric motor including a first motor body and a first drive shaft extending from a portion of the first motor body, wherein the first motor body is disposed in a first motor receptacle of the two motor receptacles, wherein the first motor body includes a front face disposed at an end of the first motor body and a rear face disposed at an opposite end of the first motor body, and wherein the first drive shaft lies in a first plane that is substantially parallel to and offset a first distance from the base;
a second electric motor attached to the motor housing, the second electric motor including a second motor body and a second drive shaft extending from a portion of the second motor body, wherein the second motor body is disposed in a second motor receptacle of the two motor receptacles, wherein the second motor body includes a front face disposed at an end of the second motor body and a rear face disposed at an opposite end of the second motor body, wherein the second drive shaft lies in the first plane, wherein the first electric motor is arranged adjacent to the second electric motor, the first electric motor oriented such that the first drive shaft is disposed facing a first direction and the second electric motor oriented such that the second drive shaft is disposed facing a second direction opposite the first direction, wherein the first drive shaft is not coaxial with the second drive shaft, and wherein the front face of the first motor body is substantially coplanar with the rear face of the second motor body and the front face of the second motor body is substantially coplanar with the rear face of the first motor body;
a first gearbox mechanically interconnected to the first drive shaft; and
a second gearbox mechanically interconnected to the second drive shaft, wherein a power output axis of the first gearbox is colinear with a power output axis of the second gearbox, wherein the power output axis of the first gearbox and the power output axis of the second gearbox lie in a second plane that is substantially parallel to and offset a second distance from the base, and wherein the second distance is greater than the first distance;
wherein a first drive axle of the two or more drive axles is mechanically attached to a power output coupling of the first gearbox along the power output axis of the first gearbox, and wherein a second drive axle of the two or more drive axles is mechanically attached to a power output coupling of the second gearbox along the power output axis of the second gearbox.

20. The vehicle of claim 19, wherein the motor gearbox unit is part of a front or rear wheel drive system of the vehicle, wherein the first electric motor is disposed adjacent to a front of the vehicle and the second electric motor is disposed behind the first electric motor further from the front of the vehicle than the first electric motor, and wherein the first drive axle is connected to a first of two or more drive wheels closest to the front or rear of the vehicle and the second drive axle is connected to a second of the two or more drive wheels closest to the front or rear of the vehicle.

\* \* \* \* \*